(12) United States Patent
Dice et al.

(10) Patent No.: US 8,677,076 B2
(45) Date of Patent: Mar. 18, 2014

(54) SYSTEM AND METHOD FOR TRACKING REFERENCES TO SHARED OBJECTS USING BYTE-ADDRESSABLE PER-THREAD REFERENCE COUNTERS

(75) Inventors: David Dice, Foxboro, MA (US); Nir N. Shavit, Cambridge, MA (US)

(73) Assignee: Oracle International Corporation, Redwood City, CA (US)

( * ) Notice: Subject to any disclaimer, the term of this patent is extended or adjusted under 35 U.S.C. 154(b) by 948 days.

(21) Appl. No.: 12/750,455

(22) Filed: Mar. 30, 2010

(65) Prior Publication Data

US 2011/0246727 A1   Oct. 6, 2011

(51) Int. Cl.
*G06F 12/00* (2006.01)
*G06F 13/00* (2006.01)
*G06F 13/28* (2006.01)

(52) U.S. Cl.
USPC ........................................ 711/152

(58) Field of Classification Search
USPC ........................................ 711/152
See application file for complete search history.

(56) References Cited

U.S. PATENT DOCUMENTS

| | | | |
|---|---|---|---|
| 7,254,597 B2 | 8/2007 | Moir et al. | |
| 7,299,242 B2 | 11/2007 | Moir et al. | |
| 7,577,798 B1 | 8/2009 | Moir et al. | |
| 2005/0015417 A1 | 1/2005 | Lewis | |
| 2006/0037026 A1 | 2/2006 | Doherty et al. | |
| 2009/0044194 A1* | 2/2009 | Rathi | 718/104 |
| 2009/0094301 A1 | 4/2009 | Joisha | |
| 2009/0125548 A1 | 5/2009 | Moir et al. | |
| 2009/0248988 A1* | 10/2009 | Berg et al. | 711/141 |

OTHER PUBLICATIONS

U.S. Appl. No. 12/492,613, filed Jun. 26, 2009.
U.S. Appl. No. 12/492,654, filed Jun. 26, 2009.
Nonblocking Memory Management Support for Dynamic-Sized Data Structures. Maurice Herlihy, Victor Luchangco, Paul Martin, and Mark Moir ACM Transactions on Computer Systems, vol. 23, No. 2, May 2005, pp. 146-196.
Lock-free reference counting. Detlefs, David L.; Martin, Paul A.; Moir, Mark; and Steele, Jr., Guy L. PODC '01: Proceedings of the twentieth annual ACM symposium on Principles of distributed computing, 2001, pp. 190-199.
Dave Dice, Nir Shavit. TLRW: Return of the Read-Write Lock. TRANSACT 2009: The 4th ACM SIGPLAN Workshop on Transactional Computing.

* cited by examiner

*Primary Examiner* — Alford W Kindred
*Assistant Examiner* — Craig Goldschmidt
(74) *Attorney, Agent, or Firm* — Robert C. Kowert; Meyertons, Hood, Kivlin, Kowert & Goetzel, P.C.

(57) ABSTRACT

The system described herein may track references to a shared object by concurrently executing threads using a reference tracking data structure that includes an owner field and an array of byte-addressable per-thread entries, each including a per-thread reference counter and a per-thread counter lock. Slotted threads assigned to a given array entry may increment or decrement the per-thread reference counter in that entry in response to referencing or dereferencing the shared object. Unslotted threads may increment or decrement a shared unslotted reference counter. A thread may update the data structure and/or examine it to determine whether the number of references to the shared object is zero or non-zero using a blocking-optimistic or a non-blocking mechanism. A checking thread may acquire ownership of the data structure, obtain an instantaneous snapshot of all counters, and return a value indicating whether the number of references to the shared object is zero or non-zero.

20 Claims, 8 Drawing Sheets

SYSTEM AND METHOD FOR TRACKING REFERENCES TO SHARED OBJECTS USING BYTE-ADDRESSABLE PER-THREAD REFERENCE COUNTERS

BACKGROUND

1. Field of the Disclosure

This disclosure relates generally to concurrent accesses to shared objects, and more particularly to a system and method for tracking references to shared objects using a reference tracking data structure that includes byte-addressable per-thread reference counters.

2. Description of the Related Art

In some computer programs, multiple program threads may execute concurrently on a single system and may access shared memory locations, including memory locations that store data representing a shared object, e.g., a shared data structure. In systems that do not include implicit garbage collection, it can be difficult to maintain dynamically allocated memory, given that a shared memory location might be accessible to multiple concurrently executing threads in a dynamic and undetectable manner. Current solutions involve hazard pointers, but these solutions are extremely complex and prone to error. Boehm style collectors have been proposed. However, Boehm collectors suffer from severe limitations and concurrent versions of these collectors are not available.

Reference counting is often used for tracking accessibility of memory locations in concurrent programs to provide information for mechanisms attempting to recycle dynamically allocated memory. A traditional reference counting solution involves associating each location with a "reference counter", e.g., a shared counter that is incremented by each thread when the thread first accesses the location and is decremented by that thread when it no longer accesses the location. A thread wishing to recycle the location may be able to detect whether it is still accessible simply by reading the associated reference counter.

There are typically two types of operations that a thread can perform on a reference counter. One is an update of the counter value, i.e. an increment or decrement of the counter in response to the thread referencing or dereferencing a shared location. The other is a check to determine whether the value of the reference counter is zero or non-zero. With traditional reference counting mechanisms, incrementing and decrementing the reference counter may need to be performed using a compare-and-swap type operation (e.g., a CAS instruction, or a load-link/store-conditional instruction pair) to maintain coherence of the counters, and such operations may be expensive in terms of latency and/or computational complexity.

As programmers attempt to tailor existing concurrent algorithms for use in highly parallel programs to be executed on multithreaded processors, traditional reference counters may not be sufficient for tracking references to shared locations in the face of increased contention between concurrently executing threads.

SUMMARY

In some embodiments, the system described herein may include mechanisms to track references to a shared portion of memory using byte-addressable per-thread reference counters. For example, a reference tracking data structure may in some embodiments be associated with a portion of memory storing data representing a shared data object (e.g. a shared data structure), and this reference tracking data structure may be used to track and determine the number of references to the shared data object by a plurality of concurrently executing threads in a multithreaded system. In other embodiments, the reference tracking data structure described herein may in some embodiments be used to implement efficient per-stripe reference indicators in systems in which a shared memory is partitioned into two or more memory stripes.

As used herein, the term "reference counter" may refer to a mechanism that counts the number of references to a shared memory location or object. In general, the value of a reference counter is non-zero as long as the shared memory location or object with which it is associated is referenced by at least one thread. Similarly, if no thread references (e.g., points to) the shared memory location or object, the value of the associated reference counter should eventually become zero. Reference counting is a technique sometimes used for implementing dynamically allocated concurrent data structures in non-garbage-collected languages and also in the implementation of garbage collectors for modern languages for concurrent programming. As used herein, the term "reference indicator" may refer to a special case of a reference counter. A reference indicator may only return an indication that the counter is non-zero, and not the actual count. Henceforth, the terms reference counter and reference indicator may be used interchangeably throughout this document.

The reference tracking data structure described herein may in some embodiments include an owner field and an array of two or more atomically addressable entries. Each of the entries may include a per-thread reference counter and a per-thread counter lock. The reference tracking data structure may be associated with a portion of a shared memory, and at most a single thread may own the reference tracking data structure at any given time. In some embodiments, one or more of a plurality of threads may be assigned to respective (different) entries of the array, such that at most a single thread is assigned to any given one of the entries (or slots). In such embodiments, the value of the per-thread reference counter of each entry may indicate the current number of references to the portion of the shared memory by the thread assigned to that entry. The value of the per-thread reference counter of a given entry may only be modifiable by the thread assigned to that entry, and only when that thread holds the per-thread counter lock.

In various embodiments, a slotted thread (i.e. one of the threads that is assigned to a respective one of the array entries) may increment the per-thread reference counter of the respective entry in response to referencing the portion of the shared memory or may decrement the per-thread reference counter of the respective entry in response to dereferencing the portion of the shared memory. In some embodiments, the tread may set the per-thread counter lock of the respective entry to a value indicating that the per-thread reference counter of the respective entry is locked by the thread prior to incrementing or decrementing the per-thread reference counter, and may set the per-thread counter lock of the respective entry to a value indicating that the per-thread reference counter of the respective entry is released (i.e. is no longer locked by the thread) subsequent to the thread incrementing or decrementing the per-thread reference counter.

In some embodiments, the reference tracking data structure may also include an unslotted reference counter whose value reflects the current number of references to the portion of the shared memory by threads that are not assigned to any of the entries of the array. In such embodiments, one of these unslotted threads may increment the unslotted reference counter in response to referencing the portion of the shared memory associated with the reference tracking data structure or may decrement the unslotted reference counter in response to dereferencing the portion of the shared memory. In some embodiments, in response to referencing or dereferencing the portion of shared memory, a slotted thread may examine the value of the owner field of the reference tracking data structure to determine whether the reference tracking data structure is owned by another thread (e.g., by a checking thread, as described below) and, if so, the slotted thread may increment or decrement the unslotted reference counter rather than the per-thread reference counter in the array entry to which the slotted thread is assigned.

In various embodiments, one of a plurality of concurrently executing threads, sometimes referred to herein as a "checking thread", may determine whether the current number of references to the portion of the shared memory is zero or non-zero. In order to determine whether the current number of references is zero or non-zero, the checking thread may first write a particular value in the owner field of the reference tracking data structure to acquire ownership of the reference tracking data structure. Once ownership is acquired, the checking thread may be able to obtain and examine a snapshot of the values of per-thread reference counters and the unslotted reference counter in order to determine whether the total number of references to the shared portion of memory was zero or non-zero at a given point in time. For example, the checking thread may examine the per-thread counter locks of the array entries, and if none of the locks are set, it may add the values of all of the per-thread reference counters and the unslotted reference counter to generate a sum representing the total number of references to the portion of shared memory. The checking thread may then return a value indicating whether the total number of references to the portion of the shared memory is zero or is non-zero, or may return the exact number of references, in different embodiments. In some embodiments, if one or more of the per-thread references counters is locked (i.e. if the corresponding per-thread counter lock is set) in order for the thread assigned to that slot to change the reference count, this may in itself be used as an indication that the reference count is non-zero.

Figure 1:
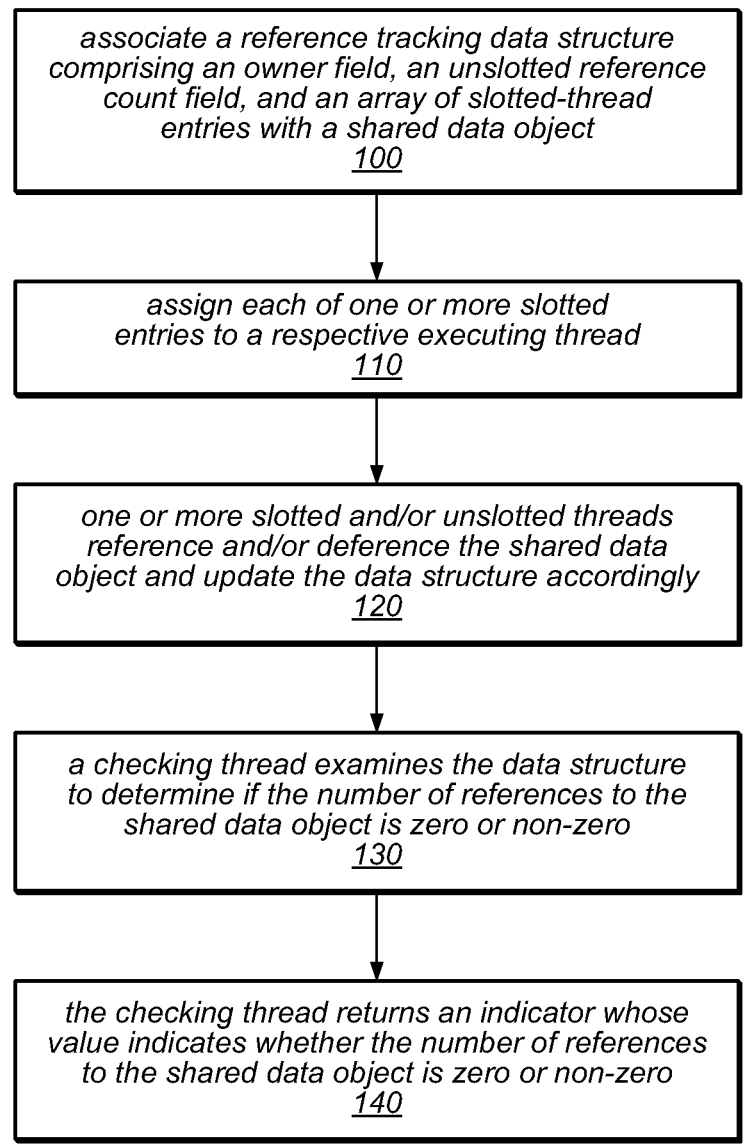
FIG. 1 is a flow diagram illustrating one embodiment of a method for tracking references to shared objects using a reference tracking data structure, as described herein.

While embodiments are described herein by way of example and with illustrative drawings, those skilled in the art will recognize that the disclosure is not limited to the embodiments or drawings described. It should be understood that the drawings and detailed description hereto are not intended to be limited to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The system described herein may in some embodiments include mechanisms for tracking references to a shared object stored in memory (e.g., a shared data structure) or another portion of shared memory (e.g., one or more memory stripes) using a data structure comprising per-thread reference counters. The reference tracking data structure may include an array of per-thread reference counters, each assigned to a specific slot in the array, and may also include a reference counter associated with threads that are not assigned to slots in the array.

As noted above, reference counting is often used for tracking accessibility of memory locations in concurrent programs. In traditional reference counting, each location is associated with a reference counter that is incremented by any thread that references the location when first accessing the location and is decremented by that thread when it no longer accesses it. There are generally two types of operations that a thread can perform on a reference counter: a modification of the counter value (e.g., an increment or decrement of the counter), and a check to see if the reference count is zero or non-zero. A thread wishing to recycle a memory location may be able to detect if the location is still being accessed simply by reading the reference counter associated with the location.

In some embodiments, a reference counter may be associated with a shared object stored in memory, or with another portion of memory that includes a plurality of memory locations. In such embodiments, if the number of references (e.g., pointers) to a shared object is non-zero, then so too must be the value of a reference counter associated with the object, and if the number of references (pointers) to the object is zero, then the reference count must eventually become zero. These two requirements respectively guarantee that the memory allocated to an object is never freed prematurely, and that the reference count associated with an object that has no pointers to it eventually becomes zero, so that the memory allocated to the object can be freed.

The observations above may imply that if a thread X is about to add a reference to a shared object stored in memory, and a thread Y is about to dereference the object (and if there are no other references to the object), it cannot be the case that thread Y completes its decrement of the reference count associated with the object before thread X completes its increment of the reference count. These observations may also imply that it is safe for a thread to increment the reference count associated with the object before creating a new pointer to it, provided that the thread eventually either creates the pointer, or decrements the reference count to compensate for the previous increment. As previously noted, with traditional reference counting, incrementing and decrementing the reference counter may need to be performed using a compare-and-swap type operation to maintain coherence of the counters, and such operations may be expensive in terms of latency and/or computational complexity. In a typical application, the frequency of modification operations that increment or decrement a reference counter is significantly higher than the frequency of de-allocation type operations that check to see if the value of the reference counter is zero. Thus, a simple reference counter that uses compare-and-swap type operations for updating the count value may not scale effectively because of the following issues:

Induced coherence traffic because of frequent writes to highly shared metadata
  Compare-and-swap failures because of interference between concurrent updates
  Eviction and subsequent misses from a cache as an artifact of the compare-and-swap implementation
  High local latency incurred by the compare-and-swap instruction itself In some embodiments, the system and methods described herein may avoid the costs related to the issues listed above, by reducing the number of compare-and-swap type operations used on the reference counter to the extent possible. As noted above, the system described herein may include mechanisms for tracking references to a shared object stored in memory (e.g., a shared data structure) or another portion of shared memory (e.g., one or more memory stripes) using a reference tracking data structure that includes byte-addressable per-thread reference counters. A reference tracking data structure associated with a shared object stored in memory or another portion of a shared memory may include an owner field, an unslotted reference counter (e.g., implemented as an atomically accessed word that reflects the current number of references to the shared object or memory area), and an array of per-slotted-thread entries (e.g., implemented as an array of individual atomically addressable bytes, each of which includes a counter reflecting the current number of references to the shared object or memory area by a particular thread). In other words, a thread accessing the reference tracking data structure may be "slotted", in which case it has been assigned a unique index (slot) in the array, or "unslotted", in which case it may use the unslotted reference counter to reflect references to the shared object or memory area by the thread. In some embodiments, a thread may use the same slot entry for its per-thread reference counter during its lifetime, while in other embodiments slots may be dynamically re-assigned to different threads at different times and for various reasons. Threads may be assigned to slots using any of a variety of mechanisms, including one described herein in which the first k threads that wish to modify the reference tracking data structure may be locally and dynamically assigned to the k slots in the array. In some embodiments, for any concurrent references to multiple shared objects or portions of memory associated with a common reference tracking data structure, at most one thread may be associated with any one slot within that reference tracking data structure at any given time. That is, multiple threads may not concurrently share a given slot in a given reference tracking data structure.

As described above, there may be two types of operations that a thread performs on a reference counter (such as a per-thread reference counter or unslotted reference counter within the reference tracking data structure described above): a modification (e.g., an increment or decrement) of the counter, or a check to see if the value of the reference counter is non-zero. For example, a thread may check the reference counter to determine whether it is safe to de-allocate dynamically allocated memory, or otherwise free it for use by another thread, process, or application. In some embodiments, it may be acceptable for multiple threads to be concurrently incrementing and/or decrementing a reference counter. However, before freeing memory (e.g., memory dynamically allocated to a data structure stored in memory), it may be necessary to determine that the number of references to that portion of memory (or that data structure) is zero, and this fact should be a stable and accurate representation of the total number of references a given point in time.

In some embodiments, a Dekker-like protocol may be employed to ensure that two threads can access a given reference counter in the reference tracking data structure described herein without conflict. For example, in some embodiments, threads that need to increment or decrement one of the reference counters to reflect a reference or dereference of a shared portion of memory may store a new value into that counter and (if it is a slotted thread) may set the corresponding per-thread counter lock. The thread may then check for the existence of an owner thread (e.g., a "checking thread") by examining the owner field in the reference tracking data structure, and may undo the modification made to the reference counter if the reference tracking data structure is owned by another thread. Threads that need to check the reference tracking data structure to determine if there are any current references to the shared portion of memory may store a value into the owner field (e.g., using a compare-and-swap type operation), and then access the unslotted reference counter and per-slotted-thread array to check for the existence of conflicting concurrent modifying threads. In some embodiments, simple global spinning may be used to resolve access mode conflicts, although local spinning or queues may be used and may in some embodiments be more scalable.

One embodiment of a method for tracking references to a shared portion of memory (e.g., a shared data object) using a data structure that includes one or more per-thread reference counters is illustrated by the flow diagram in FIG. 1. As illustrated in FIG. 1, the method may include associating a reference tracking data structure with a shared data object, as shown at 100. As described above, the data structure may include an "owner" field, which, when set to a given value, may indicate that the reference tracking data structure is currently "owned" by a checking thread, and its counter fields cannot be updated. The reference tracking data structure may also include an unslotted reference counter field (the value of which may reflect the number of unslotted threads that are referencing the shared data object), and an array of per-slotted-thread entries associated with the shared data object. As illustrated at 110 in this example, the method may include assigning each of the slotted entries to a respective executing thread, in some embodiments. In such embodiments, each entry of the array may include a per-thread reference counter and a per-thread counter lock. The value of the per-thread reference counter may indicate the current number of references to the shared data object by the thread assigned to the slot, and the value of the per-thread counter lock may provide an indication of whether the thread assigned to the slot is currently updating update its count due to a recent reference or dereference of the shared data object, as described in more detail below.

As illustrated in this example, the method may include one or more slotted and/or unslotted threads referencing or dereferencing the shared data object during execution. As shown at 120, when each of these threads references or dereferences the shared data object, it may update the data structure accordingly. For example, if the shared data object is a data structure, the thread may access one or more elements of the data structure (and thus, one or more memory locations in which the contents of the data structure are stored). For each element (and corresponding memory location) that is accessed by the thread, the thread may update one of the counters of the reference tracking data structure associated with the shared data object. The method may also include a checking thread examining the data structure to determine whether the number of references to the shared data object is zero or is non-zero, as in 130. For example, in some embodiments, making such a determination may include taking an instantaneous snapshot of the reference tracking data structure (i.e. a snapshot that includes the contents of all of the fields of the reference tracking data structure that were stored in the reference tracking data structure at a given point in time), as described in more detail below.

Finally, as illustrated in FIG. 1, the method may include returning an indicator whose value indicates whether the number of references to the shared data object is zero or non-zero, as in 140. For example, in some embodiments, the indicator may be implemented as a scalable non-zero indicator (SNZI) object, whose value does not indicate the exact number of references to the shared data object, but indicates whether it is zero or non-zero. In other embodiments, the value of the indicator may reflect the exact number of references to the shared data object.

Figure 2:
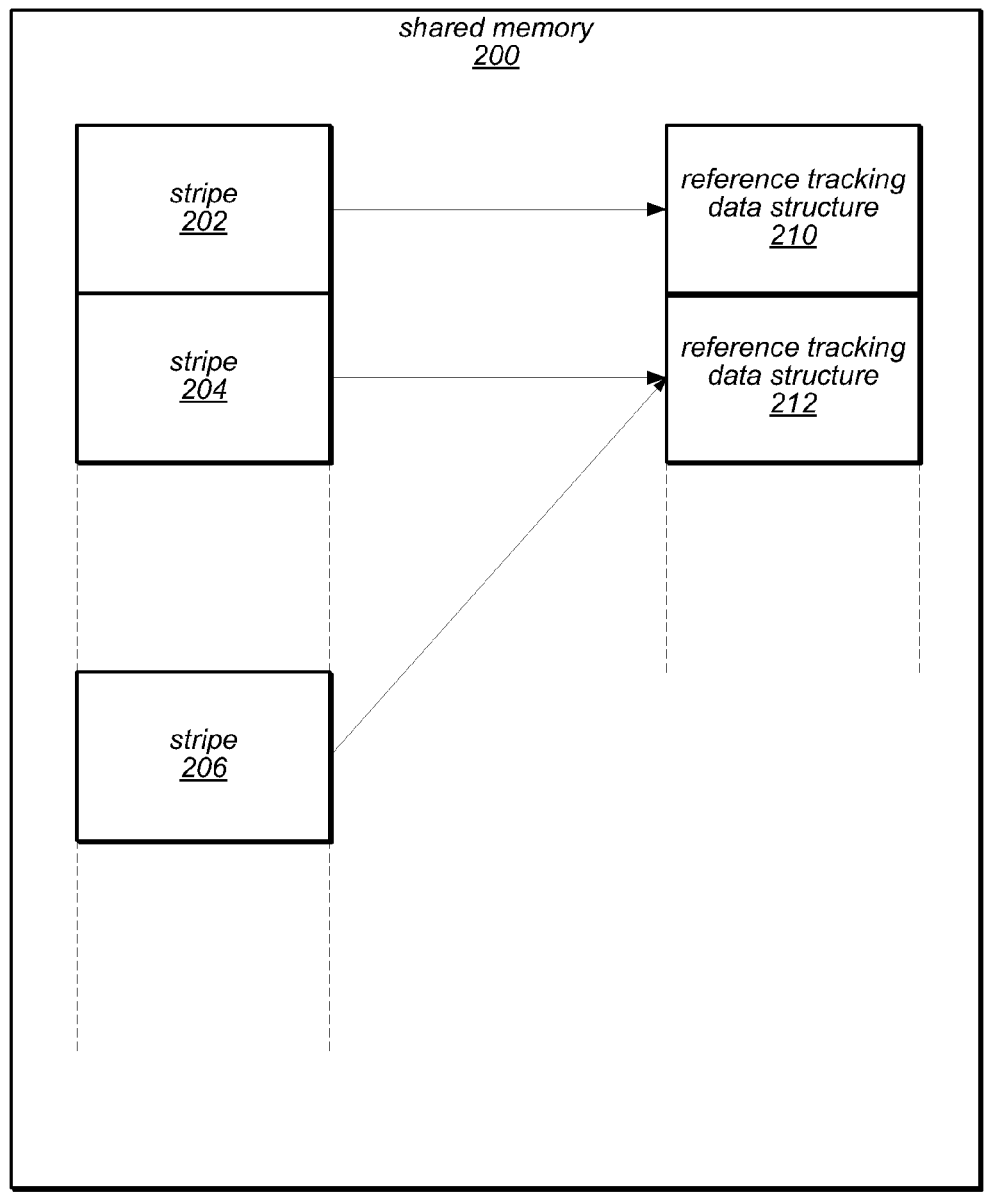
FIG. 2 is a block diagram illustrating a striping scheme for a shared memory, according to one embodiment.

In various embodiments, all or a portion of a system's memory may be partitioned into one or more stripes. A stripe may be an arbitrarily sized contiguous region of shared memory. In some embodiments, each stripe may be associated with a reference tracking data structures, which may be used to track the current number of references to one or more memory locations in the stripe. For example, FIG. 2 illustrates a striping scheme, according to one embodiment. In the illustrated embodiment, shared memory 200 is partitioned into multiple stripes (e.g., 202, 204, and 206), each of which is associated with a corresponding reference tracking data structure (e.g., 210, 212). In this example, each reference tracking data structure (e.g., reference tracking data structures 210 and 212) may include an owner field, an unslotted reference count field (the value of which may reflect the number of unslotted threads that are referencing one or more locations in the associated stripe or stripes), and an array of per-slotted-thread entries (each of which may indicate whether the corresponding thread is referencing one or more locations in the associated stripe or stripes). In some embodiments, such reference tracking data structures may be used by mechanisms that regulate dynamic allocation and/or de-allocation of the memory locations in one or more stripes with which the reference tracking data structures are associated.

In the embodiment illustrated in FIG. 2, each stripe in memory 200 is associated with a reference tracking data structure, such as reference tracking data structure 210 or reference tracking data structure 212. These associations are illustrated in FIG. 2 by the arrows. Thus, in the illustrated embodiment, stripe 202 is associated with reference tracking data structure 210 while stripe 204 is associated with reference tracking data structure 212. In various embodiments, a reference tracking data structure may be associated with more than one stripe. For example, in the illustrated embodiment, both stripe 204 and stripe 206 are associated with the same reference tracking data structure 212. In various embodiments, any scheme may be used for assigning reference tracking data structure to stripes. For example, in one embodiment, a hash function of the memory address of each stripe may be used to determine with which of a fixed number of predefined reference tracking data structure the stripe should be associated.

In some embodiments, memory may be partitioned into stripes of equal width (e.g., same number of bits). For example, in one embodiment, memory may be partitioned into stripes of one word each. In some embodiments, the stripe width may be chosen in light of hardware parameters. For example, in one embodiment, the stripe width may be the same as the width of a cache line on a deployment machine or a multiple of that width. In one such embodiment, the system may be configured to detect the width of a local cache and choose a stripe length accordingly (e.g., set the stripe width to a multiple of the cache width). In some embodiments, narrower stripe widths may be chosen to increase concurrency. In other embodiments, wider stripe widths may be chosen to reduce the cost of other expensive concurrency operations. In still other embodiments, stripes may be of variable size and/or of different sizes. For example, in some embodiments, memory may be partitioned along boundaries corresponding to various data structures and/or other shared objects stored in memory. Thus, in such embodiments, a reference tracking data structure may be assigned to one or more shared objects, each of which may be of variable size.

As described in detail herein, in various embodiments, in order to modify values in a reference tracking data structure associated with a given memory stripe, a slotted thread must hold the associated per-thread counter lock. For example, if a slotted thread references or dereferences a location in memory stripe 202, it must acquire and hold the associated per-thread counter lock corresponding to the thread's slot in reference tracking data structure 210 in order to update its per-thread reference counter. In some embodiments, in order for a checking thread to take a snapshot of reference tracking data structure 210, the thread must acquire and hold ownership of reference tracking data structure 210. In various embodiments, various types of locks may be used for the per-thread counter locks and/or ownership fields of each reference tracking data structure, and each thread may acquire and/or hold its per-thread counter lock or the ownership field of the reference tracking data structure according to various protocols. For example, in one embodiment, each per-thread counter lock and/or the ownership field of reference tracking data structure 210 may be implemented as a simple semaphore or mutual-exclusion lock that may signify one of two states: held or released. To enforce mutual exclusion, the protocol may require a checking thread to wait for the ownership field to become released, acquire ownership by changing the state to held (or to a value identifying the checking thread), and only then proceed to access reference tracking data structure 210 to obtain a snapshot of the number of references to stripe 202.

In some embodiments, a reference tracking data structure such as that described herein may be employed in a "blocking-optimistic" reference counting mechanism. This reference counting mechanism may return a reference indicator, whose value reflects whether the number of references to a given memory location or portion of a shared memory is zero or non-zero indication, or it may return the exact number of references to the given memory location or portion of the shared memory, in different embodiment. As described herein, the reference tracking data structure may include an array of reference-counters and memory locations in a shared memory may be striped (such that each stripe is mapped to a given reference counter), allowing multiple memory locations to be mapped to the same reference counter.

In one embodiment of a system that employs a blocking-optimistic reference counting mechanism, to update its per-thread reference counter, a slotted thread may store a non-zero value into the per-thread counter lock in its entry in the slotted-thread array; execute a MEMBAR #storeload instruction to make sure the store is globally visible before the following load; and then fetch the owner field of the reference tracking data structure. If the owner field is set (i.e. if its value indicates that another thread, e.g., a checking thread, owns the reference tracking data structure), then the updating thread may defer to the checking thread by clearing the per-thread counter lock in its array entry and waiting for the owner to depart before retrying acquisition of the per-thread counter lock. Otherwise, if the owner field is clear (i.e. if its value indicates that there is no current owner of the reference tracking data structure), the updating thread has successfully obtained the per-thread counter lock and can proceed to update its per-thread reference counter.

In this example, in order to update the unslotted reference counter, unslotted threads may atomically increment or decrement the unslotted reference counter and then fetch the owner field of the reference tracking data structure. If the owner field is seen to be set (e.g., if the reference tracking data structure is owned by a checking thread), the unslotted thread may retract (undo) the update to the unslotted reference counter (e.g., undoing an increment by decrementing the unslotted reference counter or undoing a decrement by incrementing the unslotted reference counter), wait for owner to depart, and then retry the updating step. Otherwise, if owner field is clear, the unslotted thread may proceed.

Note that store operations to slotted-thread array entries executed by a corresponding slotted thread (e.g., to set or clear the per-thread counter lock, or update the per-thread reference counter) need not be performed using compare-and-swap type operations, in some embodiments. In addition, updates (stores) to the per-slotted-thread array entries cannot fail or require a retry, as can be the case with compare-and-swap type operations. In addition, these operations by a slotted thread may avoid the latency and L1 cache invalidation issues typically associated with the use of compare-and-swap type operations. For example, to release its per-thread counter lock, a slotted thread may simply clear the per-thread counter lock in its array entry, overwriting the non-zero value in the entry with zero. On the other hand, an unslotted thread may need to atomically increment or decrement the unslotted reference counter field (e.g., using a compare-and-swap type operation). Thus, having the majority of references made by slotted threads may be preferable, as these threads may avoid the use of compare-and-swap operations.

Figure 3:
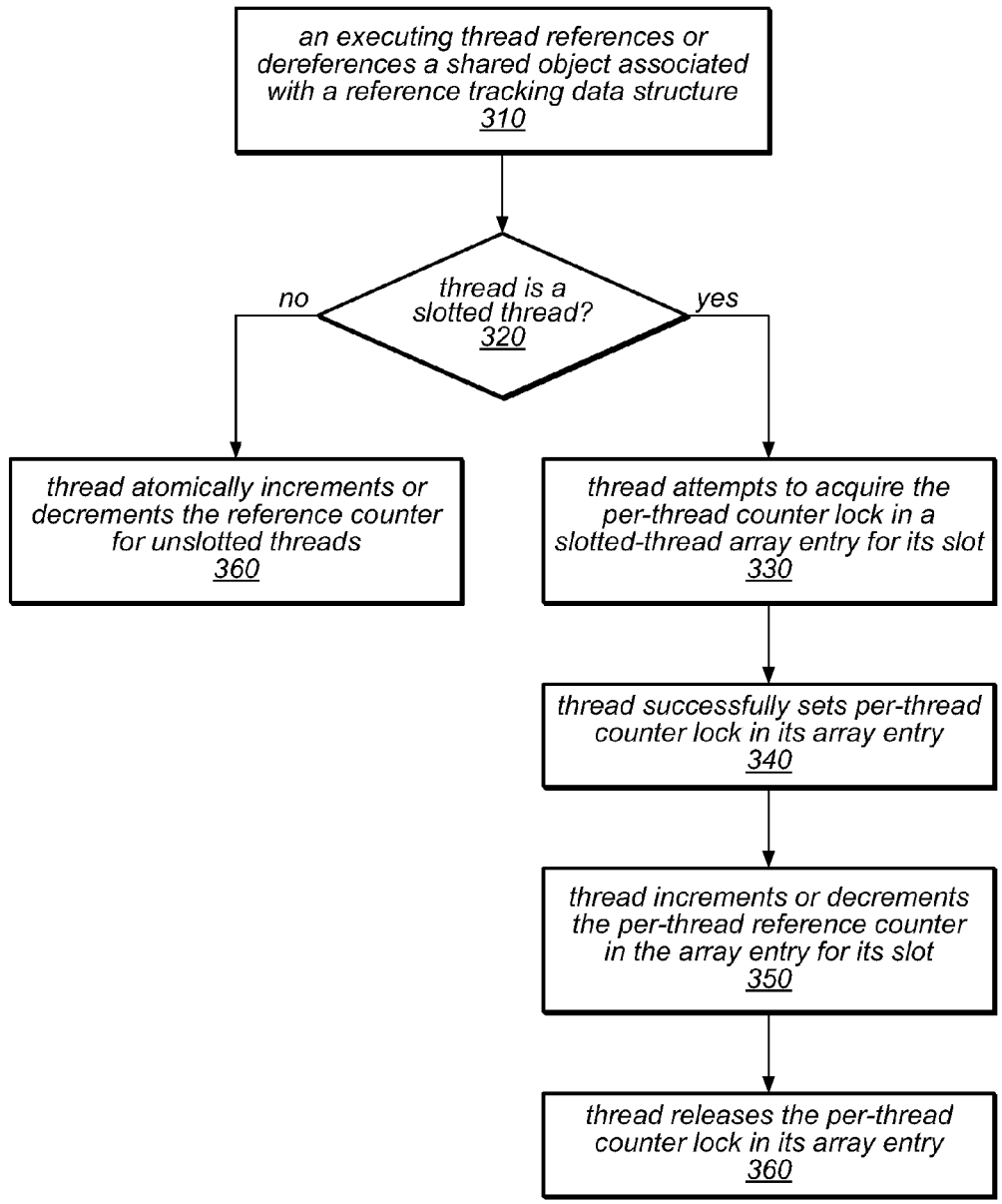
FIG. 3 is a flow diagram illustrating one embodiment of a method for updating a reference tracking data structure using a blocking-optimistic protocol, as described herein.
Figure 4:
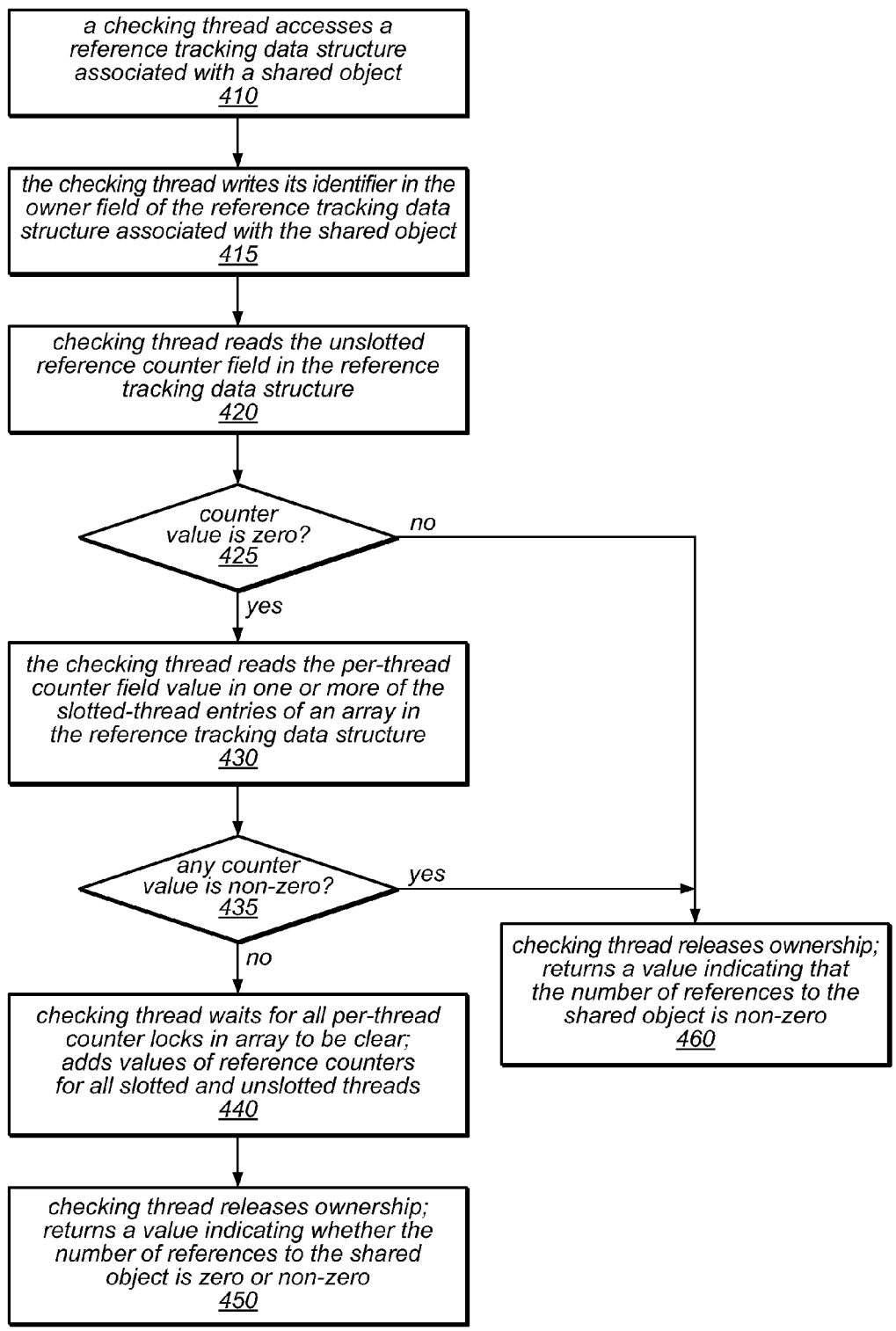
FIG. 4 is a flow diagram illustrating one embodiment of a method for determining the current number of references to a shared object from a reference tracking data structure using a blocking-optimistic protocol, as described herein.

One embodiment of a method for tracking references to a portion of a shared memory (e.g., a portion of a shared memory that represents a shared object, or another portion of a shared memory, such as one or more memory stripes, as described above) using an associated reference tracking data structure is illustrated in FIGS. 3 and 4. This example employs the blocking-optimistic implementation of the reference tracking mechanisms described herein. In this example, each of a plurality of reference tracking data structures is associated with a shared data object. However, the method may also be applied in embodiments in which each of a plurality of reference tracking data structures is associated with one or more memory stripes of the shared memory. In this example, each of the reference tracking data structures include an owner field, an unslotted reference count field, and an array of per-slotted-thread entries, such as those described herein, and each of the per-slotted-thread entries includes a per-thread counter lock and a per-thread reference counter.

For example, each entry may include a 7-bit per-thread reference counter and a single per-thread counter lock bit, which are collectively accessible at a single, byte-addressable location. FIG. 3 illustrates the portion of the method involving incrementing or decrementing various counters of the reference tracking data structure in response to a thread referencing or dereferencing an associated shared data object, while FIG. 4 illustrates the portion of the method involving checking the reference tracking data structure to determine the current number of references to the associated shared data object.

As illustrated in FIG. 3, the method may include an executing thread referencing or dereferencing a shared data object, as in 310. If the thread is an unslotted thread, shown as the negative exit from 320, the method may include the thread atomically incrementing or decrementing the unslotted reference count field of a reference tracking data structure associated with the shared data object, as in 360. For example, if an unslotted thread references the shared data object, it may increment the unslotted reference count field of the reference tracking data structure, and if an unslotted thread dereferences the shared data object, it may decrement the unslotted reference count field. In one embodiment, the unslotted reference count field may represent an 8-bit counter, and may be used to track up to 255 references to the shared data object with which it is associated. In some embodiments, after atomically incrementing or decrementing the unslotted reference counter, the thread may fetch (read) the owner field of the reference tracking data structure (not shown). In some such embodiments, if the owner field is set, indicating that another thread currently owns the reference tracking data structure associated with the shared data object, the method may include the thread retracting (i.e. undoing) the increment or decrement of the unslotted reference count field by performing the opposite action, and then waiting for the owner to depart (i.e. for the owner field to be cleared) before retrying its attempt to increment or decrement the unslotted reference count field.

If the thread is a slotted thread, shown as the positive exit from 320, the method may include the thread attempting to acquire the per-thread counter lock field in the reference tracking data structure array entry for the slot assigned to the thread, as in 330, so that it can update the per-thread reference counter in the array entry for its slot. In some embodiments, if another thread (e.g., a checking thread) currently owns the reference tracking data structure (e.g., as indicated by the value of owner field of the reference), the thread referencing or dereferencing thread may not be able to update the per-thread reference counter in its array entry, and thus may not be able to update its per-thread reference counter. In some such embodiments, the thread may have to wait until no other thread owns the reference tracking data structure before updating its per-thread counter lock and its per-thread reference counter. Once the thread successfully set its per-thread counter lock, shown as 340 in FIG. 3, the method may include the thread incrementing or decrementing the per-thread reference counter in the array entry for its slot (as in 350) to reflect a reference or dereference of the shared data object, respectively. Finally, the method may include the thread releasing the per-thread counter lock in its array entry, as in 360.

The method described above for using a reference tracking data structure to track references to a portion of a shared memory is further illustrated by the flow diagram in FIG. 4. This figure illustrates a method for checking the reference tracking data structure described above to determine the number of references to an associated shared data object. As illustrated in this example, the method may include taking an instantaneous snapshot of the individual per-thread reference counters and the unslotted reference counter, i.e. one that reflects the total number of references by slotted and unslotted threads at a given point in time. In some embodiments, this instantaneous snapshot must be performed because if a non-instantaneous (i.e. non-coherent) view of these counters returns a sum of zero, this may not guarantee that the number of references to the shared data object actually reached zero at any given point in time. For example, a naive implementation may scan the slotted-thread array in ascending order and report whether any non-zero per-thread reference counter values were encountered. At a given instant, the value of a per-thread reference counter in slot X may be zero, and the value of a per-thread reference counter in slot Y may be non-zero. A scanning thread may read the value of the counter in slot X as zero and may proceed to scan the counters in other slots. In this example, the per-thread reference counter in slot Y may not have been scanned yet when the counter in slot X was read, and may be set to a value of zero by the time it is read. In addition, another thread may set the value of the per-thread reference counter in slot X to a non-zero value by the time the counter in slot Y is read. Therefore, the checking thread may see values of zero for the counters in both slot X and slot Y during its scan. However, since the total reference count reflected by the counter in these two slots was never zero, the checking thread may return a false indication that the number of references to the shared object was at some point zero.

Note that in some embodiments, a checking thread attempting to acquire ownership of a reference tracking data structure may repeatedly use compare-and-swap type operations to try to change the owner field in the reference tracking data structure from a NULL (indicating that there is no current owner) to a value matching its own unique thread identifier. If the checking thread is a thread that previously referenced the portion of memory associated with the reference tracking data structure, it may clear the per-thread counter lock in its entry in the slotted-thread array and/or may decrement its per-thread reference counter (if it is a slotted thread), or may decrement the unslotted reference counter (if it was an unslotted thread). Once having acquired ownership, the thread may wait for the unslotted reference counter to become zero and for all per-thread reference counters in the slotted-thread array to have been observed as zero and their per-thread counter locks to be released, before attempting to obtain a snapshot of the reference tracking data structure. Once the snapshot has been obtained, the checking thread may release ownership of the reference tracking data structure by simply storing a NULL value into the owner field of the reference tracking data structure, overwriting its unique identifier.

As illustrated in FIG. 4, one embodiment of a method for determining the number of references to a shared data object may include a thread accessing the reference tracking data structure associated with the shared data object, as in 410. This checking thread may attempt to acquire ownership of the reference tracking data structure so that no other threads can increment or decrement any of the per-thread reference counters while the checking thread takes its instantaneous snapshot, as in 415. For example, in one embodiment, the checking thread may attempt to write an identifier of itself into the owner field of the reference tracking data structure associated with the shared data object using a compare-and-swap type operation. If the first attempt is unsuccessful, it may be attempted repeatedly until it is successful (not shown). For example, in some embodiments, a checking thread may not be able to write its identifier into the owner field unless the value of the owner field is a NULL value. Therefore, the checking may need to wait until the previous owner (e.g., another checking thread) has released ownership of the reference tracking data structure before it can obtain ownership of the reference tracking data structure.

Once the checking thread has acquired ownership of the reference tracking data structure, it may read the unslotted reference counter field in the reference tracking data structure, as in 420. As described above, the value of this field may in some embodiments indicate the current number of references to the shared data object by any currently executing, but unslotted, threads. If the unslotted reference counter value is non-zero, shown as the negative exit from 425, the method may include the checking thread releasing ownership of the reference tracking data structure, and returning a value indicating that the number of references to the shared data object is currently non-zero, as in 460. Note that the method may return a value indicating that the number of reference is non-zero independent of whether any of the slotted locations is locked to decrement the counter. This is because the check operation may be linearized to the point in time at which the value read from a given counter was non-zero. In some embodiments, the checking thread may return only an indication that the value is non-zero (e.g., as reflected by a SNZI value of "true"), while in other embodiments, the checking thread may return an exact number of current references to the shared data object by one or more unslotted threads.

As illustrated in FIG. 4, if the value in the unslotted reference count field is zero, shown as the positive exit from 425, the method may include the checking thread reading the per-thread reference counters in one or more of the slotted-thread entries of a slotted-thread array in the reference tracking data structure, as in 430. For example, in some embodiments, the checking thread may read the per-thread references counters of the array entries (one at a time) until a non-zero value is encountered, or until all of the per-thread reference counters have been examined. If the value of any of the per-thread reference counters is non-zero, shown as the positive exit from 435, the method may include the checking thread releasing ownership of the reference tracking data structure, and returning a value indicating that the number of references to the shared data object is currently non-zero, as in 460. As in the example, above, this may be independent of whether any of the per-thread counter locks is locked in order to decrement the corresponding per-thread reference counter, because the checking operation may be linearized to the point in time at which the value it read from a given counter was non-zero. In some embodiments, the checking thread simply may return an indication of a non-zero value (e.g., as reflected by a SNZI value of "true"), while in others it may return an exact number of current references to the shared data object by one or more slotted threads.

As illustrated in this example, if the value of all of the per-thread reference counters is zero, shown as the negative exit from 435, the method may include the checking thread waiting for all per-thread counter locks in the slotted-thread array to be released (e.g., their values to be clear). At this point, the checking thread has exclusive access to the per-thread reference counters in each of the slots. The checking thread may then add the values of the per-thread reference counters of the slotted threads and the value of the unslotted reference count field to determine the current number of references to the shared data object, as in 440. Note that the set of slotted and unslotted reference counter values collected form a snapshot. In other words, this set of counter values must have existed together in memory at some point in time during the check, because when reading the unslotted reference counter value, the checking thread held ownership of the reference tracking data structure, preventing the per-thread reference counters in any of the slotted-thread array entries from being modified. Therefore, if the checking thread determines that the value of the unslotted reference counter is zero, then there existed a point in time within the checking operation at which all of the reference counter values were zero.

Once the snapshot described above has been obtained and examined, the method may then include the checking thread releasing ownership of the reference tracking data structure, and returning a value indicating whether the number of references to the shared data object is currently zero or non-zero, as in 450. In some embodiments, the checking thread may return an indication that merely reflects a zero or a non-zero value (e.g., e.g., as reflected by a SNZI value of "false" or "true"), rather than an exact number of current references to the shared data object by one or more slotted and/or unslotted threads.

Note that in standard reference counting, reaching zero is a stable property. In other words, once the value of a reference counter reaches zero, it typically remains zero. In embodiments in which this is the case, a per-thread reference counter or unslotted reference counter whose value has reached zero would not be expected to be incremented again. Note, however, that the algorithm described above may provide a non-zero indication even if this property is not held, i.e. even if reaching zero is not a stable condition for a given counter. Therefore, in some embodiments, the algorithm described above may be used to implement a non-zero indicator in software transactional memory implementations that relay on such indicators.

In some embodiments, reference tracking data structures, such as those described herein, may be employed in non-blocking linearizable reference counting implementations. Such implementations may employ reference tracking data structures having the same basic structure as in the blocking-optimistic implementations described above. For example, they may employ a reference tracking data structure that includes an array of per-thread reference counters, each implemented using a structure having the same fields as those described for use in the blocking-optimistic scheme. However, embodiments that implement a non-blocking reference counting mechanism may adhere to a protocol relies on the property that a reference count value of zero is a stable condition, i.e. that once it becomes zero, it does not change. As previously noted, this may imply that if a thread X is about to add a reference to a shared object and a thread Y is about to dereference the share object, and if there are no other references to the object, it cannot be the case that Y completes a decrement of a reference counter associated with the share object before X completes its increment of the associated reference counter.

Figure 5:
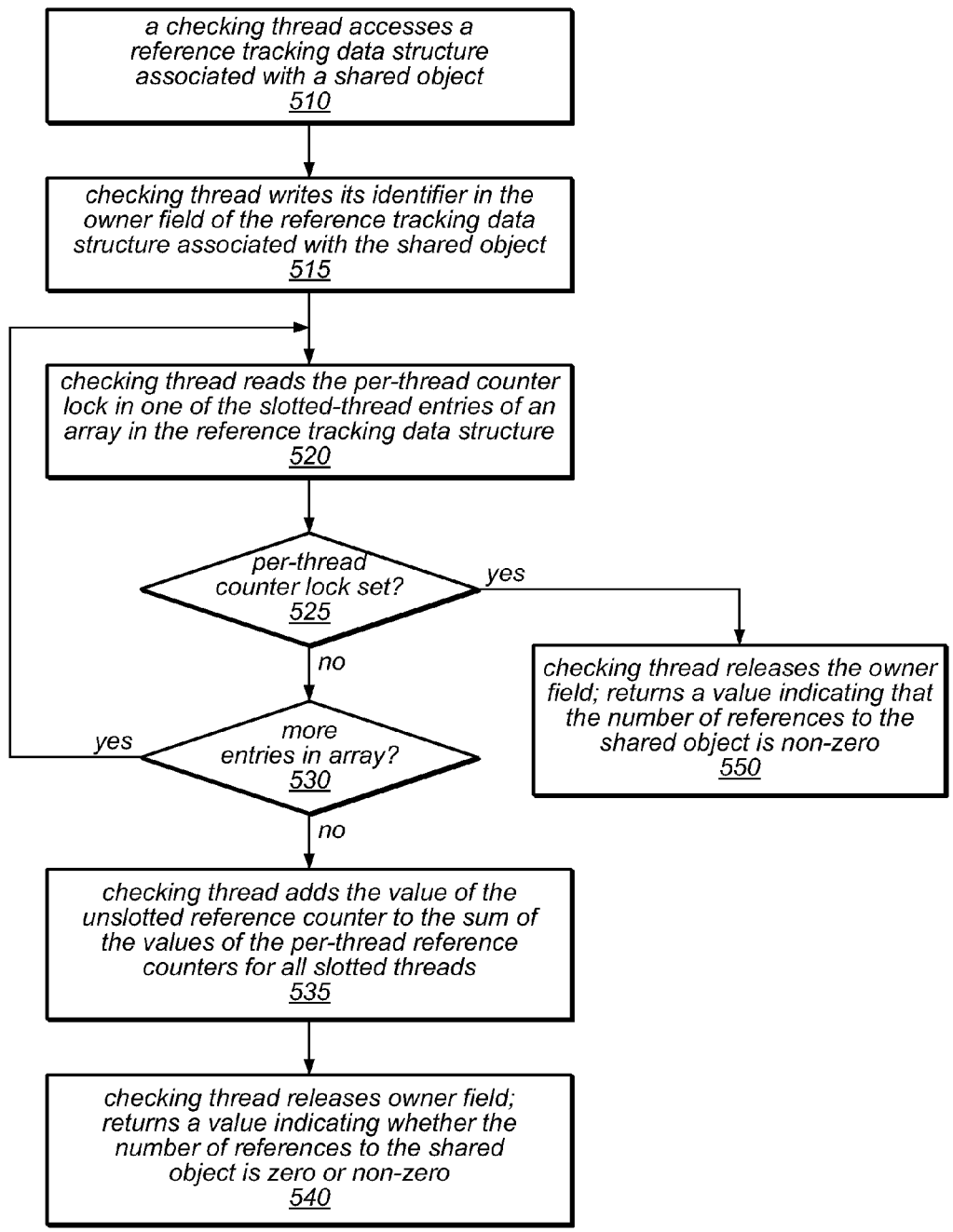
FIG. 5 is a flow diagram illustrating one embodiment of a method for determining the current number of references to a shared object from a reference tracking data structure using a non-blocking protocol, as described herein.
Figure 6:
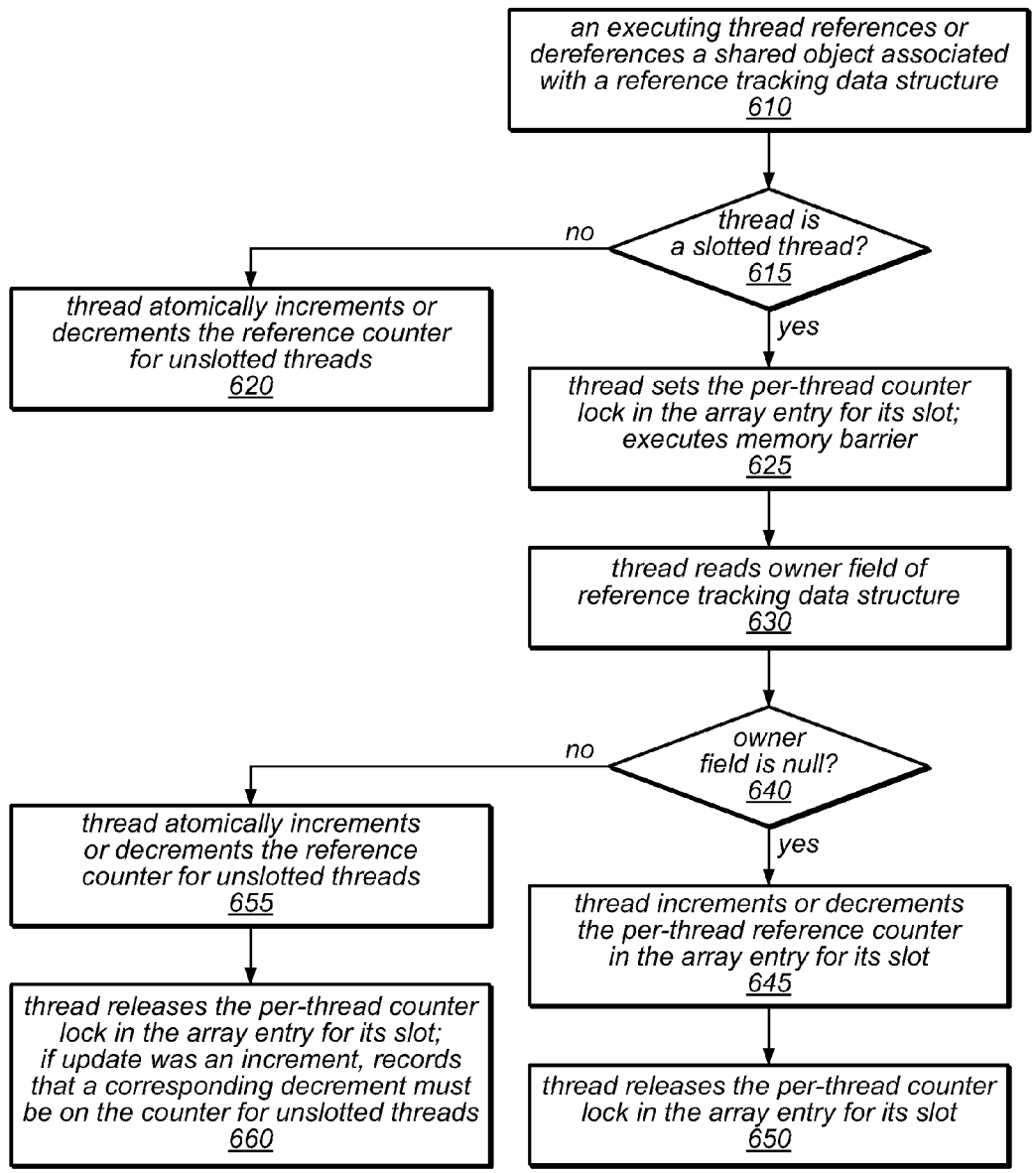
FIG. 6 is a flow diagram illustrating one embodiment of a method for updating a reference tracking data structure using a non-blocking protocol, as described herein.

One embodiment of a non-blocking method for using a reference tracking data structure to track the current number of references to a shared object (or other portion of shared memory) is illustrated by the flow charts in FIGS. 5 and 6. FIG. 5 illustrates the portion of the method involving checking the reference tracking data structure to determine the current number of references to an associated shared object (e.g., by taking an instantaneous snapshot of the reference tracking data structure), while FIG. 6 illustrates the portion of the method involving incrementing or decrementing various counters of the reference tracking data structure in response to referencing or dereferencing the associated shared object. As illustrated in FIG. 5, the method may include a checking thread accessing a reference tracking data structure associated with a shared object, as in 510. This checking thread may attempt to acquire ownership of the reference tracking data structure so that no other threads can increment or decrement any of its per-thread reference counters while the checking thread takes its instantaneous snapshot, as in 515. For example, in one embodiment, the checking thread may attempt to write an identifier of itself into the owner field of the reference tracking data structure associated with the shared object using a compare-and-swap type operation. If the first attempt is unsuccessful, it may be attempted repeatedly until it is successful (not shown). For example, in some embodiments, a checking thread may not be able to write its identifier into the owner field unless the value of the owner field is a NULL value. Therefore, the checking may need to wait until the previous owner (e.g., another checking thread) has released ownership of the reference tracking data structure before it can obtain ownership of the reference tracking data structure.

Once the checking thread has acquired ownership of the reference tracking data structure, the method may include the checking thread reading the per-thread counter lock of one of the slotted-thread entries of a slotted-thread array in the reference tracking data structure, as in 520. If the per-thread counter lock is set, the method may include the checking thread releasing ownership of the reference tracking data structure, and returning a value indicating that the number of references to the shared object is currently non-zero, as in 550. In this example, returning an indication that the number of references is non-zero in this case is valid because an incrementing or decrementing thread (i.e. one that increments or decrements the per-thread reference counter for its slot) does not hold a per-thread counter lock upon completion of such an operation. Therefore, if the per-thread counter lock is being held, then either the corresponding per-thread reference counter was non-zero and is still being decremented, or the corresponding per-thread reference counter is being incremented and is non-zero (even if the value of the per-thread reference counter does not yet reflect this fact).

If the per-thread counter lock is not set, shown as the negative exit from 525, the method may include determining if there are more slotted-thread entries in the array (as in 530), and repeating the operations illustrated as 520-530 for one or more other slotted thread entries of the array. In other words, in some embodiments, the checking thread may read the per-thread references counters of the array entries (one at a time) until encountering a per-thread counter lock that is set, or until all of the per-thread reference counters have been examined. Once there are no more slotted-thread entries to examine in the array (and if none of the per-thread counter locks in the array were set), shown as the negative exit from 530, the method may include the checking thread adding up the values of all of the per-thread reference counters in the slotted-thread entries of the array, and then adding to that the value of the unslotted reference counter to determine the current number of threads that are referencing the shared object, as in 535. Note that, in this example, the unslotted reference counter may have a negative value (as described in more detail below). Therefore, if, when the checking thread adds the unslotted reference counter value to the sum of the per-thread reference counters for the slotted threads, the sum of all the reference counter values is non-zero, this may indicate that the current number of references to the shared object is non-zero.

If, on the other hand, the sum of all of the reference counter values is zero, this may indicate that the current number of references to the shared object is zero. As illustrated at 540, the checking thread may release ownership of the reference tracking data structure (e.g., by resetting the value of the owner field) and return an indication of whether the current number of references to the shared object is non-zero (e.g., by returning a SNZI value of "true") or is zero (e.g., by returning a SNZI value of "false"). In other embodiments, the checking thread may return an exact number of current references to the shared object by one or more slotted threads.

The method described above for using a reference tracking data structure to track references to a portion of a shared memory is further illustrated by the flow diagram in FIG. 6. This figure illustrates the portion of the method involving incrementing or decrementing various counters of the reference tracking data structure in response to referencing or dereferencing the associated shared object. As illustrated at 610, in this example, the method may include an executing thread referencing or dereferencing a shared object (or another portion of a shared memory) associated with a reference tracking data structure, such as the reference tracking data structure described above. If the thread is an unslotted thread, shown as the negative exit from 615, the method may include the thread atomically incrementing or decrementing the unslotted reference counter of the reference tracking data structure, as in 620. For example, if an unslotted thread references the shared data object, it may increment the unslotted reference count field of the reference tracking data structure, and if an unslotted thread dereferences the shared data object, it may decrement the unslotted reference count field. In one embodiment, the unslotted reference count field may represent an 8-bit counter, and may be used to track up to 255 references to the shared data object with which it is associated. In some embodiments, after atomically incrementing or decrementing the unslotted reference counter, the thread may fetch (read) the owner field of the reference tracking data structure (not shown). In some such embodiments, if the owner field is set, indicating that another thread currently owns the reference tracking data structure associated with the shared object, the method may include the thread retracting (i.e. undoing) the increment or decrement of the unslotted reference count field by performing the opposite action, and then waiting for the owner to depart (i.e. for the owner field to be cleared) before retrying its attempt to increment or decrement the unslotted reference count field.

If the thread is a slotted thread, shown as the positive exit from 615, the method may include the thread setting the per-thread counter lock in the array entry for its slot, and executing a memory barrier, as in 625. The method may include the thread reading the owner field of the reference tracking data structure, as in 630, to determine if there is a checking thread currently taking an instantaneous snapshot of the reference tracking data structure, as described above. As illustrated in this example, if the owner field value is NULL (i.e. if there is no checking thread that has set the owner field to an identifier of itself, or to another value indicating that the reference tracking data structure is owned by the checking thread), the method may include the thread atomically incrementing or decrementing the per-thread reference counter in the array entry for its slot. This is shown in FIG. 6 as the positive exit from element 640 and element 645. The method may then include the thread releasing the per-thread counter lock in the array entry for its slot (e.g., by resetting the value of the per-thread counter lock), as in 650.

As illustrated in this example, if the owner field is non-NULL (i.e. if it indicates that a checking thread owns the reference tracking data structure and/or is currently taking a snapshot of the reference tracking data structure), shown as the negative exit from 640, the method may include the thread atomically incrementing or decrementing the unslotted reference count field of the reference tracking data structure (as in 655), rather than the per-thread reference counter in the array entry for the thread's slot. For example, the thread may increment or decrement the unslotted reference count field using a compare-and-swap type operation, in some embodiments. The thread may then release the per-thread counter lock in the array entry for its slot (e.g., by resetting the value of the per-thread counter lock), as in 660.

Note that in some embodiments, if the update was an increment, the method may also include the thread recording an indication that any corresponding decrement for this reference (e.g., the other half of a reference/dereference pair by this thread) must be performed on the unslotted counter. For example, in one embodiment this may be done by maintaining a thread-local counter whose value indicates how many of these corresponding decrements should be performed on the unslotted reference count field by the thread (e.g., in response to dereferencing the shared object). In such embodiments, the thread may never increment the per-thread reference counter in its slot for that particular reference to the shared object. In other words, in this example, an increment operation that could not be performed on the per-thread reference counter of the array entry for the slot assigned to a slotted thread because the reference tracking data structure is owned by a checking thread is instead performed on the shared unslotted reference counter field. This may allow the slotted thread to complete its operation even if the thread is prevented from acquiring its per-thread counter lock by a concurrently executing checking thread.

In some embodiments, a similar approach may be applied with respect to decrements by slotted threads. For example, a slotted thread that wishes to decrement its per-thread reference counter may acquire its per-thread counter lock, then check to see if there is a concurrent check in progress (i.e. if a checking thread currently owns the reference tracking data structure). If so, the slotted thread may perform the decrement on the shared unslotted reference counter instead. Note that increments and decrements of the shared unslotted reference counter by slotted threads may be performed using compare-and-swap type operations, in order to manage any contention with any other concurrently executing threads that may also wish to update the unslotted reference counter. Once a slotted thread modifies the unslotted reference counter, it may release its per-thread counter lock. In embodiments in which the unslotted reference counter may be decremented by a slotted thread, it could be possible that there are per-thread reference counters that always have a positive value and for which the corresponding decrements are reflected by decrements performed on the unslotted reference counter, whose value can be negative. However, in either case, once the decrement is complete, the per-thread counter lock for the slotted thread may be released.

The reference counting mechanism described above may be referred to as lock-free because checking is done by reading the per-thread reference counters in each slot, then reading the shared unslotted reference counter. The checking operation completes after detecting that one or more of the per-thread reference counters is locked or after adding the values of the per-thread reference counters of all of the slots and the unslotted reference counter. In such embodiments, incrementing and decrementing may be referred to as lock-free because they involve setting a per-thread counter lock, incrementing a thread-local reference counter in the slot or the shared unslotted reference count using a compare-and-swap operation, and then releasing the per-thread counter lock. Therefore, in such embodiments, one thread cannot keep another thread from being able to update the reference tracking data structure in response to a reference or dereference of a shared object associated with the reference tracking data structure.

The reference tracking data structure described herein may in some embodiments be thought of as a linearizable reference indicator. For example, if a per-thread reference counter of a given slotted thread has set its per-thread counter lock bit, but has yet to update the per-thread reference counter, then another thread must still have a non-zero reference counter value. This is because it cannot be the case that there are reachable objects to which there are no references. In other words, because the value of a per-thread reference counter of a given slotted thread never becomes zero until the slotted thread has no references to a shared object (or other memory location) associated with the reference tracking data structure, its non-zero counter contribution will be detected. This is because if a thread's contribution to the per-thread counter in slot Y becomes zero by the time it is read by a checking thread (either in its local counter or in the shared unslotted counter), but the overall count is non-zero, then the value of the per-thread counter in another slot X must have become non-zero.

The only way that the non-zero contribution of thread X could not be detected is if the per-thread counter in the slot assigned to thread X slot is read before the per-thread counter contribution of thread Y becomes zero. In this case, the per-thread contribution of thread X may become non-zero at a later time, but may never be checked again. The system and method described herein may overcome this problem as follows. If the owner field is set prior to setting the per-thread counter lock, for any slot in which the per-thread counter lock is not set, the per-thread reference counter will not be incremented until the owner field becomes NULL again. This is because an incrementing thread may first perform a Dekker protocol with respect to the owner, i.e. it may set the per-thread counter lock bit, then execute a MEMBAR operation, and then read the owner field. If the per-thread counter lock bit was not set by the owner thread, then it must have been set after the owner field was written to a non-null value. Therefore, the incrementing thread will detect that the owner field is non-null and will add its contribution to the shared unslotted reference counter. In the example above, this shared unslotted reference counter is the last to be read, and it cannot, by the definition of the reference counting problem, be that the contribution of thread Y becomes zero before this shared unslotted reference counter is incremented. Thus, at the point at which the contribution of thread Y became zero, thread X must have already incremented the shared unslotted reference counter, and the overall non-zero reference count will be detected.

Note that even if a checking thread that owns the reference tracking data structure reads a temporary value of a counter as non-zero (i.e. if the value becomes non-zero and is then set to zero again because an incrementing thread noticed that the owner field was non-null), this could only happen if there was a point within the interval during which the check was performed at which the overall reference count of the indicator was non-zero. Therefore, returning a non-zero indication in this case maintains linearizability.

Figure 7A:
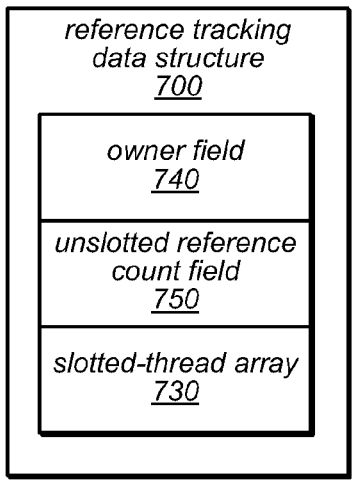
FIGS. 7A-7D illustrate various embodiments of data structures, and/or portions thereof, that may be used to track references to a shared object, as described herein.

As described herein, each shared object or other portion of shared memory (e.g., a portion of memory comprising one or more memory stripes) may be associated with reference tracking data structure, which may be used to track the current number of references to the shared object or portion of shared memory, according to various embodiments. FIGS. 7A-7D illustrate various data structures that may be associated with a shared object (or other portion of a shared memory), according to different embodiments. These data structures are merely examples of data structures that may be used in tracking references to shared objects (or other shared memory areas), and are not meant to be limiting. In other embodiments, more, fewer, or different data structures may be employed in tracking references to shared objects (or shared memory areas), and those data structures may include more, fewer, or different fields. In one example, FIG. 7A illustrates a reference tracking data structure 700 that includes an owner field 740. In different embodiments, owner field 740 may be implemented as a single ownership status bit indicating whether or not the reference tracking data structure is currently owned by a checking thread, or as an owner field whose value either identifies a checking thread that owns the reference tracking data structure, or indicates that no checking thread owns the reference tracking data structure (e.g., if the value is NULL). In various embodiments, a thread may use a compare-and-swap type operation to update owner field 740 when acquiring and/or releasing ownership of reference tracking data structure 700.

Figure 7B:
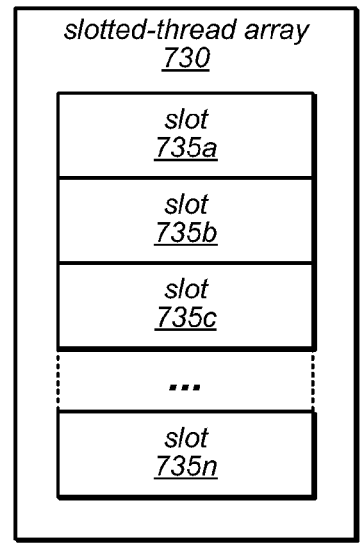

As illustrated in this example, reference tracking data structure 700 may also include an unslotted reference count field 750 and a slotted-thread array 730, such as those described herein. For example, the value of unslotted reference count field 750 may indicate the current number of references to the shared object (or memory area) by one or more currently executing, but unslotted, threads without identifying the particular unslotted threads that are referencing the shared object (or memory area). As illustrated in FIG. 7B, in some embodiments, slotted-thread array 730 may include array of entries (e.g., bytes), each of which represents a slot with which a slotted thread is associated. In some embodiments, all threads are "slotted", i.e., each thread in the system corresponds to a dedicated entry in each slotted-thread array. For example, slotted-thread array 730 may include one or more slots 735a-735n, each of which is used to track references to the shared object by a corresponding thread a-n that holds a per-thread counter lock. In this example, in order to update its per-thread reference counter, a thread may first check owner field 740 to determine whether the reference tracking data structure is owned by a checking thread. In other embodiments, such as in the example illustrated in FIG. 7C, the thread may check an ownership status bit 720 and/or a current/latest owner field 710 to determine whether the reference tracking data structure is owned by a checking thread. If the reference tracking data structure is not owned by a checking thread, the thread may update the appropriate entry 735 of the slotted-thread array 730 associated with ownership record 700 to set the per-thread counter lock, and then may check the write ownership status bit 720 again to ensure that it has not been set since the last time it was checked and that the per-thread reference counter is now owned for updating by the thread.

Figure 7C:
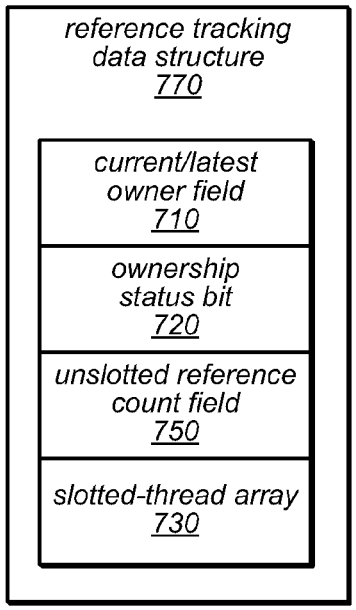
Figure 7D:
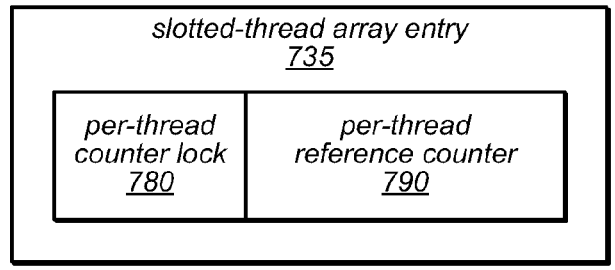

As illustrated in the example slotted-thread array entry 735 depicted in FIG. 7D, each entry of slotted-thread array 730 may include a per-thread counter lock 780, and a per-thread reference counter 790, which may be used to track references to a shared data object associated with reference tracking data structure 700 by the thread associated that slot. For example, in some embodiments, per-thread counter lock 780 may be implemented as a single bit of an 8-bit entry that also includes a 7-bit per-thread reference counter 790. In such embodiments, per-thread counter lock 780 and per-thread reference counter 790 may be addressable as a single byte. For example, they may be accessed using a single-target compare-andswap type operation to atomically check the state of the per-thread counter lock and updated the contents of slotted-thread array entry 735.

In some embodiments, a reference tracking data structure associated with a shared object (or other memory area) may be owned by a checking thread if and only if its ownership field (or ownership status bit) indicates so (e.g., if it is non-zero), and the reference tracking data structure may be updated by a thread that references or dereferences the shared object (or memory area) if and only if a corresponding entry in its slotted-thread array is non-zero, and the owner field (or ownership status bit) does not indicate that it is owned by a checking thread. Otherwise, the reference tracking data structure may be considered to be free (not owned).

FIG. 7C illustrates another example of a reference tracking data structure, according to some embodiments. In this example, reference tracking data structure 770 includes an unslotted reference count field 750, and a slotted-thread array 730, which may be similar to those described above. As illustrated in FIG. 7C, rather than including a single owner field 740, reference tracking data structure 770 includes both an ownership status bit 720 and a current/latest owner field 710. In this example, ownership status bit 720 may be implemented as a single bit whose value indicates whether the reference tracking data structure is currently owned by a checking thread. In this example, current/latest owner field 710 may be used to store an identifier of a checking thread, if any, that currently owns reference tracking data structure 770, or, if reference tracking data structure 770 is not currently owned by a checking thread, an identifier of the latest thread to have owned the reference tracking data structure for checking). In some embodiments, if reference tracking data structure 770 is not currently owned by a checking thread, current/latest owner field 710 may store a value indicating that there is no current owner (e.g., a NULL value) and/or ownership status bit 720 may store a value indicating that there is no current owner (e.g., a value representing "false"). In various embodiments, a compare-and-swap type operation may be used to update owner field 740 and/or current/latest owner field 710 when acquiring and/or releasing ownership of reference tracking data structure 770.

In some embodiments, an unslotted thread may use a compare-and-swap type operation to attempt to update a count of references to the shared object (or memory area) associated with reference tracking data structure 770. For example, a thread may use a compare-and-swap type operation to atomically check that there is no current owner of reference tracking data structure 770 and (if not) to update the unslotted reference count field 750. In other embodiments, a scalable non-zero indicator, or SNZI (not shown) may be included in a reference tracking data structure instead of, or in addition to, an unslotted reference count field 750 that represents a specific counter value. In some embodiments, a thread may update unslotted reference count field 750 using a compare-and-swap type operation if there is no current owner of reference tracking data structure 770.

In various embodiments, a system for tracking references to portions of a shared memory may include more, fewer, or different reference tracking data structures and/or other features than those described herein. For example, in one embodiment, a multiple access approach in which the $2^7$ possible values of each byte in a given slot represent a counter may be used to add a re-entrant feature to read-write byte locks, such as those described in co-pending U.S. patent application Ser. No. 12/492,613, filed Jun. 26, 2009, and naming David Dice and Nir N. Shavit as co-inventors.

In another embodiment, the reference counting mechanisms described herein may include an algorithm for assigning slots in the slotted-thread array of a reference tracking data structure and/or in an array of read-write byte locks. In one such embodiment, two or more bits of each byte-addressable entry in the array may be used as a slot assignment field for the entry. For example, the slot assignment field may be used to count up to the number of locations in one cache line, or up to a multiple of the number of locations in one cache line. In such embodiments, the first time each thread accesses a location associated with a given reference tracking data structure or protected by a given byte lock, it may use a compare-and-swap type operation to increment a per-thread reference counter, and in the same atomic instruction may increment the slot assignment count by one. It may use the value it read from the slot assignment count as its slot in the array in all its subsequent accesses. After the initial increment of the per-thread reference counter, the per-thread reference counter may be decremented and incremented multiple times, but the slot assignment field may only grow till k (where k is the number of available slots) and may never incremented or decremented again. In such embodiments, for any location associated with a reference tracking data structure having k slots or protected by a byte lock having k slots, the first k threads to access it may be slotted, and all later threads may be unslotted.

In sill other embodiments, the non-blocking reference counting mechanisms described herein may be modified to allow a representation of negative values in the $2^7$ bits of each thread-local reference counter (i.e. the per-thread reference counters in each slot of the slotted-thread array).

Figure 8:
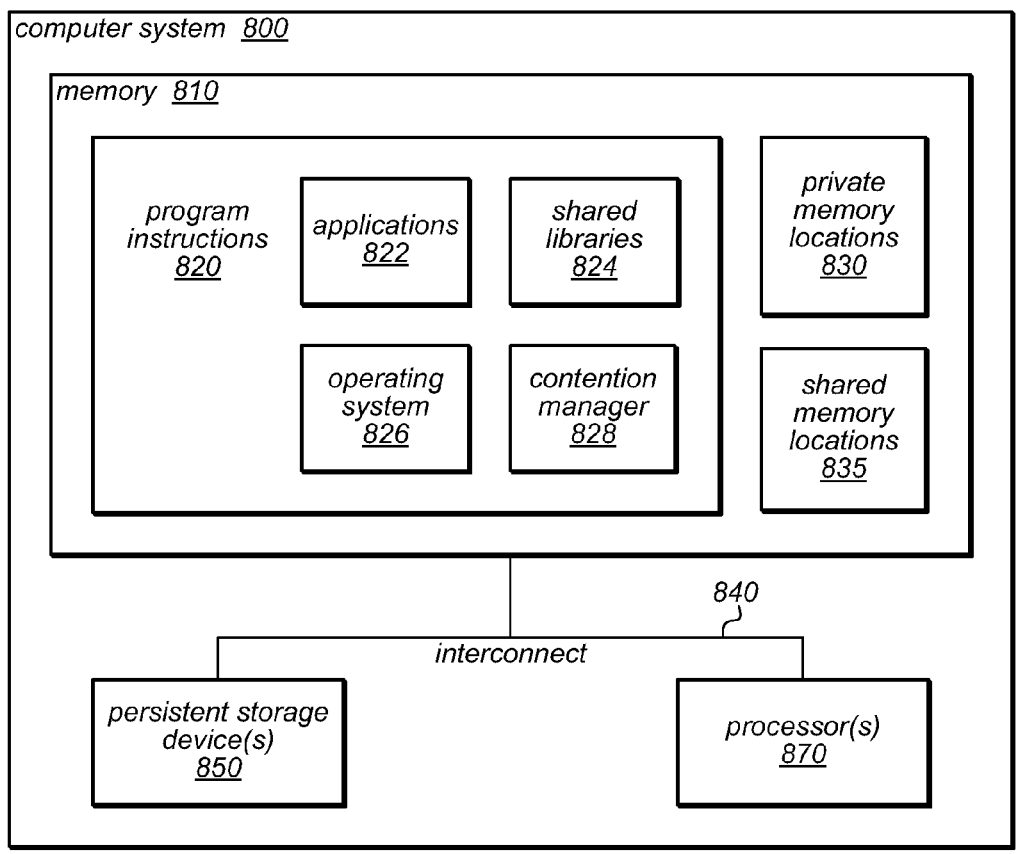
FIG. 8 is a block diagram illustrating a computer system configured to implement reference tracking of shared objects using reference tracking data structures that include per-thread reference counters, according to various embodiments.

FIG. 8 illustrates a computing system configured to implement the methods described herein, according to various embodiments. The computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for tracking references to shared objects and/or shared memory areas (e.g., stripes of memory) described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 800 may include one or more processors 870; each may include multiple cores, any of which may be single or multi-threaded. The computer system 800 may also include one or more persistent storage devices 850 (e.g. optical storage, magnetic storage, hard drive, tape drive, solid state memory, etc) and one or more memories 810 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 8 (e.g., video cards, audio cards, additional network interfaces, peripheral devices, a network interface such as an ATM interface, an Ethernet interface, a Frame Relay interface, etc.)

The one or more processors 870, the storage device(s) 850, and the system memory 810 may be coupled to the system interconnect 840. One or more of the system memories 810 may contain program instructions 820. Program instructions 820 may be executable to implement one or more applications 822, shared libraries 824, operating systems 826, or contention managers 828, as described herein. Program instructions 820 may be encoded in platform native binary, any interpreted language such as Java™ byte-code, or in any other language such as C/C++, Java™, etc., or in any combination thereof. The program instructions 820 may be executable to provide functions, operations and/or other processes for implementing tracking of references to shared objects using reference tracking data structures, as described herein. Such functions may exist in one or more of the shared libraries 824, operating systems 826, contention managers 828, or applications 822, in various embodiments.

The system memory may further comprise private memory locations 830 and/or shared memory locations 835 where data may be stored. For example, these locations may store data in one or more reference tracking data structures, one or more slotted-thread arrays, one or more thread-local or global read-write conflict indicators, one or more data structures configured to store metadata (e.g., snapshots) associated with operations that access a shared memory (e.g., a read set, write set, or ownership record), and/or other data structures accessible to a plurality of concurrently executing threads, processes, or transactions, in various embodiments. As described herein shared memory locations 835 may include shared memory partitioned into two or more memory stripes, each of which may be associated with a reference tracking data structure, as described herein. Similarly, shared memory locations 835 may include portions of shared memory storing data representing a shared data structure or other shared object associated with a reference tracking data structure, as described herein.

Although the embodiments above have been described in considerable detail, numerous variations and modifications will become apparent to those skilled in the art once the above disclosure is fully appreciated. For example, although many of the embodiments are described in terms of counting references to shared data structures, it should be noted that the techniques and mechanisms disclosed herein may be applicable in other contexts in which references to particular objects or groups of objects may be tracked, including, but not limited to, systems in which memory is dynamically allocated to various objects and subsequently de-allocated. It is intended that the following claims be interpreted to embrace all such variations and modifications.

What is claimed:

1. A method, comprising:
   performing, by one or more computers:
   associating a portion of a shared memory with a reference tracking data structure comprising an owner field and an array of two or more atomically addressable entries, wherein each of the entries comprises a per-thread reference counter and a per-thread counter lock, and wherein at most a single thread can own the reference tracking data structure at any given time;
   assigning each individual thread of one or more of a plurality of threads to a different respective one of the two or more entries of the array, wherein each of the one or more of the plurality of threads is assigned to a different entry in the array such that at most a single thread is assigned to any given one of the entries, wherein the per-thread reference counter of each entry indicates a current number of references to the portion of the shared memory by the thread assigned to the entry, and wherein the per-thread counter lock of each entry indicates whether the thread assigned to the entry is currently updating the per-thread reference counter of the entry;
   one of the plurality of threads determining whether the current number of references to the portion of the shared memory is zero or non-zero, wherein said determining comprises:
   the one of the plurality of threads writing a particular value in the owner field to acquire ownership of the reference tracking data structure; and
   the one of the plurality of threads examining one or more of the entries of the array; and
   the one of the plurality of threads returning a value indicating whether the current number of references to the portion of the shared memory is zero or is non-zero.

2. The method of claim 1,
   wherein said examining one or more of the entries of the array comprises examining the value of the per-thread counter lock in each of the one or more entries to determine if the per-thread reference counter of the entry is locked; and
   wherein said returning a value comprises returning a value indicating that the current number of references to the portion of the shared memory is non-zero, without returning an exact number of references to the portion of the shared memory, in response to the one of the plurality of threads determining that one or more of the per-thread reference counters of the one or more entries is locked.

3. The method of claim 1,
   wherein said examining one or more of the entries of the array comprises:
   examining the value of the per-thread counter lock in each of the entries to determine if any of the per-thread reference counters are locked; and
   in response to determining that none of the per-thread reference counters is locked, adding the values of all of the per-thread reference counters to generate a sum of the values of all of the per-thread reference counters; and
   wherein said returning a value comprises returning a value that is dependent on the sum of the values of all of the per-thread reference counters.

4. The method of claim 1,
   wherein the reference tracking data structure further comprises an unslotted reference counter whose value reflects a current number of references to the portion of the shared memory by one or more threads that are not assigned to any of the entries of the array; and
   wherein said examining one or more of the entries of the array comprises adding the values of all of the per-thread reference counters and the value of the unslotted reference counter to generate the current number of references to the portion of the shared memory.

5. The method of claim 1,
wherein said returning a value comprises returning the exact number of references to the portion of the shared memory.

6. The method of claim 1, further comprising:
one of the one or more of a plurality of threads assigned to a respective entry of the array incrementing the per-thread reference counter of the respective entry in response to referencing the portion of the shared memory or decrementing the per-thread reference counter of the respective entry in response to dereferencing the portion of the shared memory;
wherein said incrementing and said decrementing are performed using a write access operation that does not include a compare-and-swap type synchronization operation.

7. The method of claim 1, further comprising one of the one or more of a plurality of threads assigned to a respective entry of the array:
setting the per-thread counter lock of the respective entry to a value indicating that the per-thread reference counter of the respective entry is locked by the one of the one or more of a plurality of threads, wherein the value of the per-thread reference counter can be modified only by the one of the one or more of the plurality of threads and only when the one of the one or more of the plurality of threads holds the per-thread counter lock;
incrementing the per-thread reference counter of the respective entry in response to referencing the portion of the shared memory or decrementing the per-thread reference counter of the respective entry in response to dereferencing the portion of the shared memory; and
setting the per-thread counter lock of the respective entry to a value indicating that the per-thread reference counter of the respective entry is no longer locked by the one of the one or more of a plurality of threads.

8. The method of claim 1,
wherein the reference tracking data structure further comprises an unslotted reference counter whose value reflects a current number of references to the portion of the shared memory by one or more threads that are not assigned to any of the entries of the array; and
wherein the method further comprises one of the one or more of a plurality of threads assigned to a respective entry of the array:
examining the value of the owner field of the reference tracking data structure to determine whether the reference tracking data structure is owned by another thread; and
in response to determining that the reference tracking data structure is owned by another thread, incrementing the unslotted reference counter in response to referencing the portion of the shared memory or decrementing the unslotted reference counter in response to dereferencing the portion of the shared memory.

9. The method of claim 1,
wherein the reference tracking data structure further comprises an unslotted reference counter whose value reflects a current number of references to the portion of the shared memory by one or more threads that are not assigned to any of the entries of the array; and
wherein the method further comprises one of the one or more threads that are not assigned to any of the entries of the array incrementing the unslotted reference counter in response to referencing the portion of the shared memory or decrementing the unslotted reference counter in response to dereferencing the portion of the shared memory, wherein said incrementing and said decrementing are performed using a compare-and-swap type synchronization operation.

10. The method of claim 1, wherein the portion of the shared memory comprises one or more of a plurality of stripes of memory locations into which the shared memory is partitioned.

11. A non-transitory computer readable storage medium, comprising program instructions that when executed on one or more computers cause the one or more computers to perform:
associating a portion of a shared memory with a reference tracking data structure comprising an owner field and an array of two or more atomically addressable entries, wherein each of the entries comprises a per-thread reference counter and a per-thread counter lock, and wherein at most a single thread can own the reference tracking data structure at any given time;
assigning each individual thread of one or more of a plurality of threads to a different respective one of the two or more entries of the array, wherein each of the one or more of the plurality of threads is assigned to a different entry in the array such that at most a single thread is assigned to any given one of the entries, wherein the per-thread reference counter of each entry indicates a current number of references to the portion of the shared memory by the thread assigned to the entry, and wherein the per-thread counter lock of each entry indicates whether the thread assigned to the entry is currently updating the per-thread reference counter of the entry;
one of the plurality of threads determining whether the current number of references to the portion of the shared memory is zero or non-zero, wherein said determining comprises:
the one of the plurality of threads writing a particular value in the owner field to acquire ownership of the reference tracking data structure; and
the one of the plurality of threads examining one or more of the entries of the array; and
the one of the plurality of threads returning a value indicating whether the current number of references to the portion of the shared memory is zero or is non-zero.

12. The storage medium of claim 11, wherein said examining one or more of the entries of the array comprises:
examining the value of the per-thread counter lock in each of the one or more entries to determine if the per-thread reference counter of the entry is locked; and
in response to determining that none of the per-thread reference counters is locked, adding the values of all of the per-thread reference counters to generate a sum of the values of all of the per-thread reference counters;
wherein said returning a value comprises returning a value indicating that the current number of references to the portion of the shared memory is non-zero in response to the one of the plurality of threads determining that the sum of the values of all of the per-thread reference counters is non-zero or that one or more of the per-thread reference counters of the one or more entries is locked; and
wherein said returning a value comprises returning a value indicating that the current number of references to the portion of the shared memory is zero in response to the one of the plurality of threads determining that that none of the per-thread reference counters of the one or more entries is locked and that the sum of the values of all of the per-thread reference counters is zero.

13. The storage medium of claim 11,
wherein the reference tracking data structure further comprises an unslotted reference counter whose value reflects a current number of references to the portion of the shared memory by one or more threads that are not assigned to any of the entries of the array;
wherein the program instructions, when executed on the one or more computers, further cause the one or more computers to perform:
one of the one or more threads that are not assigned to any of the entries of the array incrementing the unslotted reference counter in response to referencing the portion of the shared memory or decrementing the unslotted reference counter in response to dereferencing the portion of the shared memory, wherein said incrementing the unslotted reference counter and said decrementing the unslotted reference counter are performed using a compare-and-swap type synchronization operation; and
one of the one or more of a plurality of threads assigned to a respective entry of the array incrementing the per-thread reference counter of the respective entry in response to referencing the portion of the shared memory or decrementing the per-thread reference counter of the respective entry in response to dereferencing the portion of the shared memory, wherein said incrementing the per-thread reference counter and said decrementing the per-thread reference counter are performed using a write access operation that does not include a compare-and-swap type synchronization operation;
wherein said examining one or more of the entries of the array comprises adding the values of all of the per-thread reference counters and the value of the unslotted reference counter to generate the current number of references to the portion of the shared memory.

14. The storage medium of claim 11, wherein the program instructions, when executed on the one or more computers, further cause one of the one or more of a plurality of threads assigned to a respective entry of the array to perform:
setting the per-thread counter lock of the respective entry to a value indicating that the per-thread reference counter of the respective entry is locked by the one of the one or more of a plurality of threads, wherein the value of the per-thread reference counter can be modified only by the one of the one or more of the plurality of threads and only when the one of the one or more of the plurality of threads holds the per-thread counter lock;
incrementing the per-thread reference counter of the respective entry in response to referencing the portion of the shared memory or decrementing the per-thread reference counter of the respective entry in response to dereferencing the portion of the shared memory; and
setting the per-thread counter lock of the respective entry to a value indicating that the per-thread reference counter of the respective entry is no longer locked by the one of the one or more of a plurality of threads.

15. The storage medium of claim 11,
wherein the reference tracking data structure further comprises an unslotted reference counter whose value reflects a current number of references to the portion of the shared memory by one or more threads that are not assigned to any of the entries of the array; and
wherein the program instructions, when executed on the one or more computers, further cause one of the one or more of a plurality of threads assigned to a respective entry of the array to perform:
examining the value of the owner field of the reference tracking data structure to determine whether the reference tracking data structure is owned by another thread; and
in response to determining that the reference tracking data structure is owned by another thread, incrementing the unslotted reference counter in response to referencing the portion of the shared memory or decrementing the unslotted reference counter in response to dereferencing the portion of the shared memory.

16. A system, comprising:
one or more hardware processors; and
a memory storing program instructions that when executed on the one or more processors cause the one or more processors to perform:
associating a portion of a shared memory with a reference tracking data structure comprising an owner field and an array of two or more atomically addressable entries, wherein each of the entries comprises a per-thread reference counter and a per-thread counter lock, and wherein at most a single thread can own the reference tracking data structure at any given time;
assigning each individual thread of one or more of a plurality of threads to a different respective one of the two or more entries of the array, wherein each of the one or more of the plurality of threads is assigned to a different entry in the array such that at most a single thread is assigned to any given one of the entries, wherein the per-thread reference counter of each entry indicates a current number of references to the portion of the shared memory by the thread assigned to the entry, and wherein the per-thread counter lock of each entry indicates whether the thread assigned to the entry is currently updating the per-thread reference counter of the entry;
one of the plurality of threads determining whether the current number of references to the portion of the shared memory is zero or non-zero, wherein said determining comprises:
the one of the plurality of threads writing a particular value in the owner field to acquire ownership of the reference tracking data structure; and
the one of the plurality of threads examining one or more of the entries of the array; and
the one of the plurality of threads returning a value indicating whether the current number of references to the portion of the shared memory is zero or is non-zero.

17. The system of claim 16,
wherein said examining one or more of the entries of the array comprises:
examining the value of the per-thread counter lock in each of the one or more entries to determine if the per-thread reference counter of the entry is locked; and
in response to determining that none of the per-thread reference counters is locked, adding the values of all of the per-thread reference counters to generate a sum of the values of all of the per-thread reference counters;
wherein said returning a value comprises returning a value indicating that the current number of references to the portion of the shared memory is non-zero in response to the one of the plurality of threads determining that the sum of the values of all of the per-thread reference counters is non-zero or that one or more of the per-thread reference counters of the one or more entries is locked; and wherein said returning a value comprises returning a value indicating that the current number of references to the portion of the shared memory is zero in response to the one of the plurality of threads determining that that none of the per-thread reference counters of the one or more entries is locked and that the sum of the values of all of the per-thread reference counters is zero.

18. The system of claim 16, wherein the reference tracking data structure further comprises an unslotted reference counter whose value reflects a current number of references to the portion of the shared memory by one or more threads that are not assigned to any of the entries of the array;

wherein the program instructions, when executed by the one or more processors, further cause the one or more processors to perform:

one of the one or more threads that are not assigned to any of the entries of the array incrementing the unslotted reference counter in response to referencing the portion of the shared memory or decrementing the unslotted reference counter in response to dereferencing the portion of the shared memory, wherein said incrementing the unslotted reference counter and said decrementing the unslotted reference counter are performed using a compare-and-swap type synchronization operation; and one of the one or more of a plurality of threads assigned to a respective entry of the array incrementing the per-thread reference counter of the respective entry in response to referencing the portion of the shared memory or decrementing the per-thread reference counter of the respective entry in response to dereferencing the portion of the shared memory, wherein said incrementing the per-thread reference counter and said decrementing the per-thread reference counter are performed using a write access operation that does not include a compare-and-swap type synchronization operation;

wherein said examining one or more of the entries of the array comprises adding the values of all of the per-thread reference counters and the value of the unslotted reference counter to generate the current number of references to the portion of the shared memory.

19. The system of claim 16, wherein the program instructions, when executed by the one or more processors, further cause one of the one or more of a plurality of threads assigned to a respective entry of the array to perform:

setting the per-thread counter lock of the respective entry to a value indicating that the per-thread reference counter of the respective entry is locked by the one of the one or more of a plurality of threads, wherein the value of the per-thread reference counter can be modified only by the one of the one or more of the plurality of threads and only when the one of the one or more of the plurality of threads holds the per-thread counter lock;

incrementing the per-thread reference counter of the respective entry in response to referencing the portion of the shared memory or decrementing the per-thread reference counter of the respective entry in response to dereferencing the portion of the shared memory; and setting the per-thread counter lock of the respective entry to a value indicating that the per-thread reference counter of the respective entry is no longer locked by the one of the one or more of a plurality of threads.

20. The system of claim 16, wherein the reference tracking data structure further comprises an unslotted reference counter whose value reflects a current number of references to the portion of the shared memory by one or more threads that are not assigned to any of the entries of the array; and wherein the program instructions, when executed by the one or more processors, further cause one of the one or more of a plurality of threads assigned to a respective entry of the array to perform:

examining the value of the owner field of the reference tracking data structure to determine whether the reference tracking data structure is owned by another thread; and in response to determining that the reference tracking data structure is owned by another thread, incrementing the unslotted reference counter in response to referencing the portion of the shared memory or decrementing the unslotted reference counter in response to dereferencing the portion of the shared memory.

* * * * *

UNITED STATES PATENT AND TRADEMARK OFFICE
CERTIFICATE OF CORRECTION

PATENT NO. : 8,677,076 B2  
APPLICATION NO. : 12/750455  
DATED : March 18, 2014  
INVENTOR(S) : Dice et al.

Page 1 of 1

It is certified that error appears in the above-identified patent and that said Letters Patent is hereby corrected as shown below:

In the Specification

In column 18, line 52, after "the" delete "write".

In the Claims

In column 24, line 64, in Claim 12, delete "that that" and insert -- that --, therefor.

In column 27, line 7, in Claim 17, delete "that that" and insert -- that --, therefor.

Signed and Sealed this
Twenty-fourth Day of June, 2014

Michelle K. Lee
*Deputy Director of the United States Patent and Trademark Office*